Figure 1:
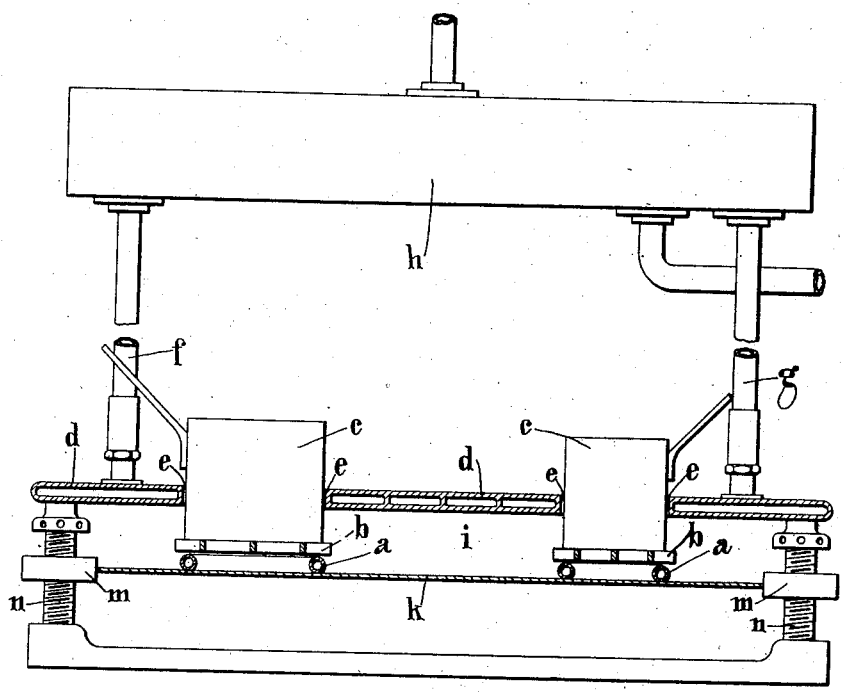

W. H. PIRRIE.
GAS COOKING STOVE AND THE LIKE.
APPLICATION FILED JULY 17, 1909.

994,533.

Patented June 6, 1911.

WITNESSES
W. A. Burk
A. F. Heuman

INVENTOR
William Harold Pirrie
BY Wallace White
ATTY.

THE NORRIS PETERS CO., WASHINGTON, D. C.

UNITED STATES PATENT OFFICE.

WILLIAM HAROLD PIRRIE, OF BATTERSEA PARK, LONDON, ENGLAND.

GAS COOKING-STOVE AND THE LIKE.

994,533.

Specification of Letters Patent. Patented June 6, 1911.

Application filed July 17, 1909. Serial No. 508,225.

*To all whom it may concern:*

Be it known that I, WILLIAM HAROLD PIRRIE, a subject of the King of Great Britain and Ireland, and residing at 9 Park Mansions, Battersea Park, in the county of London, England, have invented certain new and useful Improvements in and Relating to Gas Cooking-Stoves and the Like, of which the following is a specification.

In cooking stoves heated by gas or other fluid only about one-third of the heat is absorbed by the cooking vessels, while the remaining two-thirds is wasted and consequently attempts have been made to utilize this waste heat for other purposes, as for instance, the production of hot water for domestic purposes. In such systems a hot-plate, on which dishes or the like can stand has been made either hollow itself or provided with means for circulating water in its vicinity, the stream in any case being connected by suitable circulating pipes to the usual reservoir or cistern. Great difficulties have however, presented themselves in carrying out the above suggestions since it is essential that no heat shall be withdrawn from the cooking vessels. According to one plan, the hollow hot-plate was provided with apertures corresponding to the position of the burners, the cooking vessels standing directly on the hot-plate over these apertures. With such an arrangement, however, it was found that a kettle of water for instance, took 20% longer to boil than in the case of the original stoves. This appeared to be due to two facts, namely, that the cooking vessel closing the aperture in the hot-plate formed a closed pocket in which a cushion of more or less non-conductive gases collected, while at the same time heat was drawn from the cooking vessel itself by conduction to the hot-plate. Attempts were made to get over this difficulty by providing ribs on the top of the hot-plate on which the cooking vessel stood, and although this plan shortened the time required for carrying out a given cooking operation, nevertheless owing to the free and direct passage of the heated gases through the aperture, only a relatively small amount of heat was imparted to the hot plate and transmitted thence to the circulating water.

The object of the present invention is thus to provide a suitable hot water circulating plate in connection with a cooking stove, in which the cooking vessels under similar conditions of working receive as much heat as heretofore, while waste heat is efficiently used in heating the water circulating through the hot-plate.

To these ends the present invention consists in the combination of parts hereinbefore described and particularly pointed out in the claims.

The arrangement forming the subject matter of the present invention has been proved by experiment to successfully solve the problem stated above, a kettle of water for instance, boiling under similar conditions as quickly with the improved arrangement as in the ordinary stove not provided with water heating arrangements. Moreover, of the two-thirds of the waste heat previously lost about one-half is now usefully employed in heating water, while at the same time the hot-plate proper is available for the heating of dishes and the like.

Figure 2:
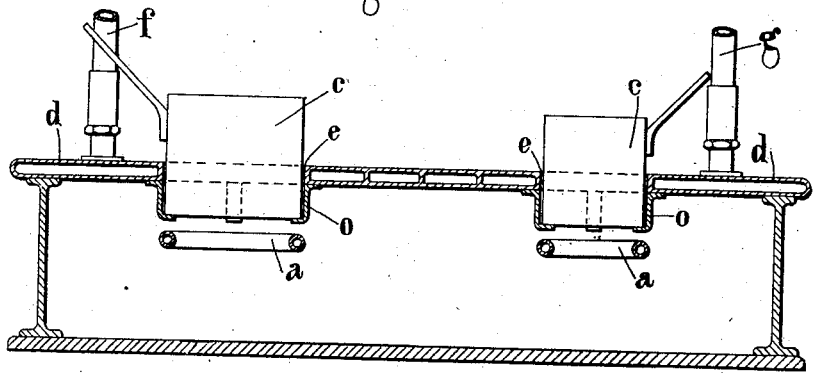

Referring to the accompanying drawings: Figure 1 shows a view partly in section of one form of the invention, Fig. 2 showing a similar view of a modification.

In carrying the invention into effect according to one form as shown in Fig. 1, the stove is provided with the usual burners, $a$, arranged below the grid, $b$, on which stands the cooking vessels, $c$, as heretofore. At a distance above the bottom of the cooking vessel at least as great as the distance of the bottom of the cooking vessel above the burner, is arranged the hot-plate proper, $d$, surrounding the cooking vessels with a small clearance, $e$, which is designed to be just sufficient to insure perfect combustion of the gases. This clearance may vary from three to six millimeters or thereabout. A vessel comprising a bottom and side walls constituting a water receptacle is in the present example of the invention formed integral with the hot plate proper, $d$, and is disposed immediately therebelow. This water receptacle is connected as shown by the usual pipes, $f$ and $g$, to the cistern or reservoir, $h$.

By the arrangement described the cooking vessel is maintained in the same relation to the burners as heretofore, and therefore receives as much heat, while the space marked, $i$, between the bottom of the cooking vessel and the bottom of the water receptacle forms a combustion space into which the bulk of the hot gases is deflected by the bottom of the cooking vessel, and heat thereby imparted to the circulating water.

In order to provide for perfect combustion of the gases under different conditions of pressure or with different qualities of gas, means may be provided for adjusting the volume of the combustion space $i$; thus for instance, the burners, $a$, may be supported on a plate, $k$, provided with enlargements, $m$, through which pass screwed pillars $n$. By turning these pillars the burners, $a$, grid, $b$, and cooking vessel, $c$, can be raised or lowered thus diminishing or increasing the volume of the combustion space $i$.

To avoid loss of heat absorbed by the fire-bars in the grid, $b$, upon which the cooking vessels stand in the form described above, the grid may be dispensed with and the cooking vessel supported as shown in Fig. 2, by means of hangers, $o$, secured to the water receptacle; such hangers being of small section withdraw a very small amount of heat from the cooking vessel, but such small amount as is withdrawn is conducted to the hot-plate and usefully employed. Further to prevent waste of the heated gases a lid may be provided for each of the apertures in the hot-plate, the lid being utilized to close any aperture not being employed for cooking purposes.

Having now described my invention what I claim as new and desire to secure by Letters Patent is:—

1. In combination in a cooker, a flat shallow water-containing receptacle having an aperture therethrough from top to bottom; a burner located below said aperture and a cooking vessel deep in relation to the depth of said receptacle disposed in said aperture with a small clearance ($e$) to form a vent for the products of combustion of the burner, part of the cooking vessel protruding above said receptacle and part below and the bottom of the cooking vessel being located adjacent the burner, as set forth.

2. In combination in a cooker, a flat shallow water-containing receptacle comprising upper and lower walls and other walls therebetween certain parts of said other walls defining an aperture through said plate from top to bottom thereof; a burner located below said aperture and a cooking vessel deep in relation to the depth of said receptacle disposed in said aperture with a small clearance ($e$) to form a vent and with its bottom located adjacent the burner and below the level of the lower wall of said receptacle, the sides of the cooking vessel and said lower wall of said receptacle thereby defining a combustion space ($i$) into which gases from the burner are deflected by the bottom of the cooking vessel, as set forth.

In testimony whereof I affix my signature in the presence of two witnesses.

WILLIAM HAROLD PIRRIE.

Witnesses:
BERTRAM H. MATTHEWS,
CHARLES W. CHELL.

---

Copies of this patent may be obtained for five cents each, by addressing the "Commissioner of Patents, Washington, D. C."